United States Patent
Yakubisin (10) Patent No.: US 10,278,235 B1
(45) Date of Patent: Apr. 30, 2019

(54) ASSIGNMENT OF CHANNELS FOR COMMUNICATING WITH AN UNMANNED VEHICLE

(71) Applicant: Honeywell International Inc., Morris Plains, NJ (US)

(72) Inventor: Kyle Yakubisin, Shawnee, KS (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/730,509

(22) Filed: Oct. 11, 2017

(51) Int. Cl.
| H04W 4/70 | (2018.01) |
| H04W 84/06 | (2009.01) |
| G08G 5/00 | (2006.01) |
| G05D 1/00 | (2006.01) |
| B64C 39/02 | (2006.01) |
| H04B 7/185 | (2006.01) |

(52) U.S. Cl.
CPC ........... *H04W 84/06* (2013.01); *B64C 39/024* (2013.01); *G05D 1/0022* (2013.01); *G08G 5/0069* (2013.01); *H04B 7/18506* (2013.01)

(58) Field of Classification Search
CPC . H04W 52/282; H04W 4/70; H04W 72/0446; H04W 72/0453
USPC .................................................. 455/133, 101
See application file for complete search history.

(56) References Cited

U.S. PATENT DOCUMENTS

| 6,154,637 | A | * | 11/2000 | Wright | .................. | G05D 1/0055 |
| | | | | | | 340/539.1 |
| 6,163,681 | A | * | 12/2000 | Wright | .................. | G08G 5/0013 |
| | | | | | | 340/945 |
| 6,167,238 | A | * | 12/2000 | Wright | ................ | H04W 52/282 |
| | | | | | | 340/3.3 |
| 7,787,364 | B2 | * | 8/2010 | Maeda | ....................... | H04J 3/14 |
| | | | | | | 370/220 |
| 7,933,266 | B2 | * | 4/2011 | Zadikian | ............. | H04J 14/0227 |
| | | | | | | 370/350 |
| 8,326,291 | B2 | * | 12/2012 | Seo | ........................ | H04H 20/26 |
| | | | | | | 348/385.1 |
| 8,848,112 | B2 | * | 9/2014 | Seo | ........................ | H04H 20/26 |
| | | | | | | 348/725 |
| 9,220,086 | B2 | | 12/2015 | Wang et al. | | |
| 9,432,111 | B2 | * | 8/2016 | Takano | ................ | H04B 7/2606 |
| 9,596,026 | B2 | | 3/2017 | Wang et al. | | |
| 9,674,744 | B2 | | 6/2017 | Xue et al. | | |
| 9,749,901 | B2 | * | 8/2017 | Seok | ....................... | H04W 4/70 |
| 9,843,558 | B2 | * | 12/2017 | Seok | ....................... | H04W 4/70 |

(Continued)

FOREIGN PATENT DOCUMENTS

WO 2017025717 2/2017

*Primary Examiner* — William D Cumming
(74) *Attorney, Agent, or Firm* — Fogg & Powers LLC (57) ABSTRACT

An embodiment of a radio for disposition on an unmanned vehicle includes first and second receiver circuits. The first receiver circuit is configured to receive a signal over a current active channel within a frequency sub band corresponding to the unmanned vehicle. And the second receiver circuit is configured to monitor a respective availability and a respective quality of each of a current standby channel and at least one other channel within the frequency sub band while the first receiver circuit is receiving the signal, and to request an assignment of one of the at least one other channel as a new standby channel if the second receiver circuit determines that the quality of the one of the at least one other channel is better than the quality of the current standby channel.

20 Claims, 4 Drawing Sheets

(56) References Cited

U.S. PATENT DOCUMENTS

| | | | |
|---|---|---|---|
| 2003/0147367 A1* | 8/2003 | Pucheu | H04W 56/003 370/337 |
| 2005/0245207 A1* | 11/2005 | Suzuki | H04B 1/18 455/101 |
| 2007/0238425 A1* | 10/2007 | McFarland | H04B 1/18 455/133 |
| 2007/0287451 A1* | 12/2007 | Seo | H04H 20/26 455/434 |
| 2008/0002789 A1* | 1/2008 | Jao | H04B 7/0882 375/316 |
| 2008/0056294 A1* | 3/2008 | Maeda | H04J 3/14 370/437 |
| 2009/0052561 A1* | 2/2009 | Baxley | H04B 1/59 375/260 |
| 2009/0067542 A1* | 3/2009 | Haartsen | H03M 13/3761 375/298 |
| 2010/0177664 A1* | 7/2010 | Thoumy | H04B 7/0617 370/254 |
| 2013/0070161 A1* | 3/2013 | Seo | H04H 20/26 348/726 |
| 2013/0201050 A1* | 8/2013 | Hellsten | G01S 7/006 342/21 |
| 2014/0023381 A1* | 1/2014 | Hunt | H04B 10/112 398/207 |
| 2014/0029952 A1* | 1/2014 | Liu | H04B 10/116 398/115 |
| 2015/0101001 A1* | 4/2015 | Kang | H04N 21/4263 725/116 |
| 2015/0271137 A1* | 9/2015 | Seok | H04W 4/70 370/338 |
| 2015/0280871 A1* | 10/2015 | Xu | H04W 72/0446 370/330 |
| 2015/0289164 A1* | 10/2015 | Seok | H04W 4/70 370/311 |
| 2016/0165463 A1* | 6/2016 | Zhang | H04L 43/10 370/218 |
| 2017/0006596 A1* | 1/2017 | Adachi | H04W 72/0453 |
| 2017/0006606 A1* | 1/2017 | Matsuo | H04W 72/0446 |
| 2018/0019808 A1* | 1/2018 | Hreha | H04B 7/18521 |
| 2018/0019809 A1* | 1/2018 | Hreha | H04B 7/18521 |

* cited by examiner

ASSIGNMENT OF CHANNELS FOR COMMUNICATING WITH AN UNMANNED VEHICLE

SUMMARY

Figure 1:
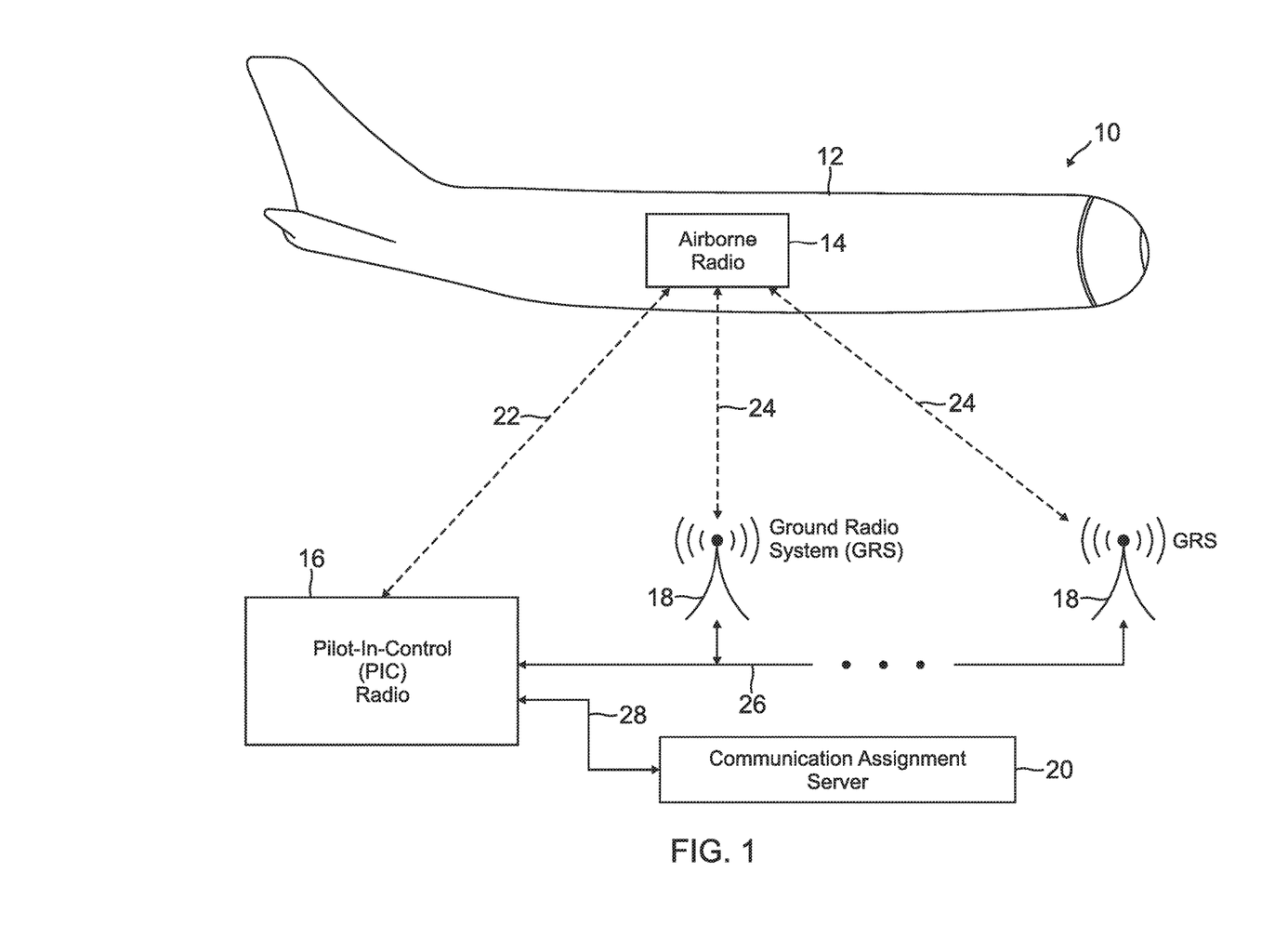
FIG. 1 is a diagram of a system that includes an unmanned aircraft and a communication system configured to allow a pilot to fly, and otherwise to control, remotely the unmanned aircraft.

FIG. 1 is a diagram of an unmanned-aircraft system 10, which includes an unmanned aircraft 12 having an airborne radio 14 (the radio is called an "airborne" radio even while the unmanned aircraft is grounded), a pilot-in-control (PIC) radio 16, one or more ground radio systems (GRS) 18, and a communication-assignment server 20.

The unmanned aircraft 12 is, for example, a military, or other type of, drone.

The airborne and PIC radios 14 and 16 are configured to communicate with one another over a selectable active wireless channel 22 so that a pilot (not shown in FIG. 1), who is remote from the unmanned aircraft 12, can maneuver, and otherwise control the operation of, the unmanned aircraft.

Each GRS 18 is configured to communicate with the airborne radio 14 over a respective selectable active wireless channel 24, and is configured to communicate with the PIC radio 16 via a communication link 26 such as a public-switched telephone network (PSTN), a mobile network, the internet, or an internet-based network (e.g., the cloud). Furthermore, each GRS 18 typically is configured to allow communication between the airborne radio 14 and the PIC radio 16 via the active wireless channel 24 only while the airborne radio is too far from the PIC radio to communicate with the PIC radio over the active channel 22.

And the communication-assignment server 20 (e.g., a hardware server on the cloud) is configured to communicate with the PIC radio 16 via a communication link 28, which can be the same as, or different from, the communication link 26. Examples of the communication link 28 include a (PSTN), a mobile network, the internet, or an internet-based network (e.g., the cloud).

The airborne radio 14, the PIC radio 16, the one or more GRSs 18, and the links 26 and 28 over which the airborne radio, the PIC radio, and the one or more GRSs communicate, can form, or can be part of, a Control and Non-Payload Communications (CNPC) Link System. In the configuration described in conjunction with FIG. 1, the system 10 can be configured as a typical CNPC terrestrial application that complies with the Radio Technical Commission for Aeronautics (RTCA) DO-362 Standard. According to the RTCA DO-362 Standard, communications over the active wireless channels 22 and 24 can be in the L frequency band (1040-1050 MHz) or in the C frequency band (5030-5090 MHz).

Still referring to FIG. 1, before the unmanned aircraft 12 takes off, the pilot (not shown in FIG. 1) sends to the assignment server 20, via the PIC radio 16 and the communication link 28, a request for an assignment of a frequency band, and of a sub band within the frequency band, for the active channel 22.

The assignment server 20 assigns, to the airborne and PIC radios 14 and 16, a frequency band (e.g., L band, C band) and a sub band within the frequency band, and notifies the PIC radio, via the communication link 28, of the frequency-band and sub-band assignment. The assignment server 20 is configured to track the use of the frequency bands and sub bands for which it has assignment control. For example, the assignment server 20 typically is configured to track the frequency-band and sub-band assignments for multiple unmanned aircraft or other unmanned vehicles in the same geographical region as the unmanned aircraft 12.

The pilot then selects, within the assigned sub band, an active frequency (heretofore and hereinafter "active channel") and a standby frequency (hereinafter "standby channel") over which the airborne and PIC radios 14 and 16 can communicate. The assigned sub band can include, for example, approximately five to fifty frequency slots (hereinafter "channels").

The pilot can select the active channel 22 and a standby channel by using the PIC radio 16 to determine the quality of each available channel within the assigned sub band, and by selecting the two channels having the highest qualities. In a detailed example, the pilot operates the PIC radio 16 to send one or more test signals to the airborne radio 14 over each available channel in the sub band (an "available channel" is a channel that the airborne and PIC radios are configured to use, and that the assignment server 20 has not identified to the PIC radio as "unavailable"). For each available channel, the airborne radio 14 determines respective channel-quality metrics such as the strength of the received signal (i.e., a measure of the level of attenuation that the channel imparts to the signal), the level of distortion in the received signal, the loss of information from packets carried by the received signal (if the received signal includes data packets and the airborne radio has a priori "knowledge" of the content of the data packets), the level of jamming of the received signal, the level of interference experienced by the received signal, and the level of noise received over the channel. The airborne radio 14 then sends, to the PIC radio 16, the determined channel-quality metrics, or combines the metrics into a quality "score" and then sends, to the PIC radio, the score, possibly along with the determined metrics; alternatively, the PIC radio can be configured to determine the score from the channel-quality metrics provided by the airborne radio. The PIC radio 16 displays, or otherwise communicates, the determined quality metrics, the score, or both the metrics and the score, to the pilot, who determines the two "best" channels in response to the displayed quality metrics or quality score for each channel, and decides which of the best channels to use for the active channel, and which to use for the standby channel. For example, the pilot can select the channel with the best overall quality as the active channel, and can select the channel with the second-best overall quality as the standby channel.

The pilot then sends to the assignment server 20, via the PIC radio 16 and the communication link 28, a request for assignment of the selected active and standby channels. If these channels are still unused, i.e., are still available, then the assignment server 20 assigns the requested channels to the airborne and PIC radios 14 and 16. If at least one of the requested channels is being used, then the assignment server 20 notifies the PIC radio 16 via the link 28, and the pilot repeats the above-described procedure until he/she selects two channels of sufficient quality that are available for assignment.

The pilot also can send, to the assignment server 20, a "blind" request for assignment of an active channel and a standby channel for each GRS 18 that covers a geographic region through which the pilot anticipates the unmanned aircraft 12 will fly. This request is "blind" because, due to the GRS 18 being out of range of the airborne radio 14, the pilot cannot test the requested active and standby channels ahead of time. That is, the pilot selects the active and standby channels for each GRS 18 in a random fashion, or guesses, based on experience or other factors, which channels are likely to have the highest qualities. Of course if a GRS 18 is within range of the airborne radio 14 at the time of the channel-assignment request, then the pilot can test the channels ahead of time using a procedure similar to that described above for the selection of the active and standby channels between the airborne radio and the PIC radio 16.

Next, using the PIC radio 16 to communicate with the unmanned aircraft 12 via the airborne radio 14, the pilot controls the unmanned aircraft 12 to take off. For example, the PIC radio 16 can include a joystick, or another interface, that allows the pilot to maneuver, and to otherwise control, the unmanned aircraft 12. Furthermore, the airborne radio 14 is configured to receive, and possibly to demodulate and to decode, signals received from the PIC radio 16, and to provide the received signals to circuitry of a control and navigation system (not shown in FIG. 1) on board the unmanned aircraft 12. In response to the received signals (as may be processed by the airborne radio), the control and navigation system maneuvers, and otherwise controls, the unmanned aircraft 12 as commanded by the pilot. For example, in addition to being configured to maneuver the aircraft 12 by moving the rudder, flaps, and ailerons, the control and navigation system can be configured to adjust the aircraft's speed by adjusting, e.g., engine thrust.

After the unmanned aircraft 12 takes off, the pilot flies the aircraft by continuing to maneuver, and otherwise to control, the aircraft via the PIC radio 16 and the airborne radio 14. For example, the pilot can maneuver the aircraft 12 to complete a mission, such as to travel to, and to target with a weapon, one or more targets. In this example, the aircraft 12 can also include one or more weapons systems (e.g., gun, missile launcher, laser, not shown in FIG. 1) that are configured for pilot control via the PIC radio 16 and the airborne radio 14.

While the pilot is remotely flying the unmanned aircraft 12, he/she monitors, via the PIC radio 16, the quality of the previously requested and assigned active wireless channel 22 (which channel is used for communication depends on the range of the aircraft from the PIC radio as described above). For example, the airborne radio 14 can continue to determine, and send to the PIC radio 16, the above-described quality metrics or quality score for the active channel 22. Or, the pilot can detect a drop in the quality of the active channel if, for example, the aircraft 12 is slow to respond, or fails to respond, to a maneuver or other command. For example, the pilot can determine such a slow response or a failure to respond, by viewing, on the PIC radio 16 or on another display, the flight path of the aircraft in real time, or video from a camera on board the aircraft 12.

If the pilot determines that the quality of the active channel 22 is so poor (e.g., at least one of the quality metrics or quality score falls below a respective threshold) that the active channel is unsuitable for piloting the unmanned aircraft 12, then he/she can cause the airborne radio 14 and the PIC radio 16 to "switch over" communications to the assigned standby channel, which, after the switch over, becomes the active channel 22.

The pilot initiates the switch over, e.g., by flipping a switch, pushing a button, or selecting an option from a menu displayed, on the PIC radio 16.

Next, the PIC radio 16 sends, over the currently active channel, a command to the airborne radio 14 to switch over to the standby channel within a predetermined time period (e.g., a few milliseconds to a few seconds); if the airborne radio does not already "know" the frequency of the standby channel, then the PIC radio also can provide this information to the airborne radio over the currently active channel.

Then, the airborne radio 14 acknowledges to the PIC radio 16 receipt of the switchover command.

Next, after the expiration of the predetermined time period, both the airborne radio 14 and the PIC radio 16 begin communicating on the former standby channel, which now becomes the current active channel 22.

The pilot can perform a similar procedure if the PIC radio 16 is communicating with the airborne radio 14 via one of the GRSs 18. In this case, the GRS 18 and the airborne radio 14 switch over to a standby channel that, after the switch over, becomes the new active channel 24.

Unfortunately, there can be problems with the unmanned aircraft system 10.

First, the need for the pilot to monitor the quality of the active channel 22 takes time mental concentration away from the pilot's other tasks and duties. And if the pilot is occupied with other aspects of flying the unmanned aircraft 12, he/she may not notice a deterioration of the quality of the active channel 22 until the quality becomes too low to allow him/her to control the unmanned aircraft.

Second, a problem can arise if the quality of the standby channel is, or later becomes, too low for allowing communications with the airborne radio 14.

Because after the pilot causes the standby channel to become the new active channel there is no assigned standby channel, if the quality of the new active channel is, or becomes, too low, then the pilot can switch back to the previous active channel, which, after the previous switch over, became the de facto standby channel.

But if the previous active channel (i.e., the new, de facto, standby channel) still has a quality that is too low for communication between the airborne and PIC radios 14 and 16, the pilot's only remaining option is to perform, anew, the above-described channel-assignment-request procedure to obtain, from the assignment server 20, a new active channel and a new standby channel (the pilot typically cannot select new active and standby channels without authorization from the assignment server).

The pilot's requesting and receiving an assignment of new active and standby channels can take a significant amount of time (e.g., 30 seconds to 10 minutes), and, unlike the first time that the pilot requested and obtained assigned active and standby channels (i.e., while the unmanned aircraft 12 was grounded), the unmanned aircraft is now airborne.

Consequently, while the pilot is testing the qualities of other channels within the sub band, and is requesting and receiving an assignment of new active and standby channels, the unmanned aircraft 12 may be out of the pilot's control, a condition called a "flyaway" condition. This is because the airborne radio 14 and the PIC radio 16 typically can communicate over only one channel at a time. So while the pilot is testing the qualities of other channels, he/she cannot send, and the airborne radio 14 cannot receive, commands to the unmanned aircraft 12 over the current active channel 22. That is, to determine what two other channels to request as the new active and standby channels, the pilot typically must switch over the PIC radio 16 and airborne radio 14 to those channels to determine their respective levels of quality.

The unmanned aircraft 12 also may experience a flyaway condition when the airborne radio 14 switches over from the active channel 22 to an active channel 24 as the unmanned aircraft 12 flies out of direct communication range of the PIC radio 16 and into range of one or more of the GRSs 18. If the quality of the new active channel 24 is too low, and the quality of the standby channel for the GRS 18 is also too low, then, as described above, the unmanned aircraft 12 may experience a flyaway condition while the pilot is testing the qualities of other channels within the sub band assigned to the airborne radio 14 and the GRS 18, and is requesting and receiving an assignment of new active and standby channels.

Unfortunately, while the unmanned aircraft 12 is experiencing a flyaway condition, and is, therefore, out of the pilot's control, or even while the aircraft is within the pilot's control but the pilot is distracted by monitoring the quality of the active channel, the aircraft may go off course, crash, activate weapons at an inappropriate time, or experience or cause other problems.

Therefore, a need has arisen for a device, such as a radio, that is configured to monitor channels in the assigned sub band other than the active channel and to request reassignment of the standby channel to one of the other channels if the quality of the standby channel is too low, or if an unused channel has a better quality than the standby channel.

An embodiment of a radio that solves at least one of the aforementioned problems is configured for disposition on an unmanned vehicle and includes first and second receiver circuits. The first receiver circuit is configured to receive a signal over a current active channel within a frequency sub band corresponding to the unmanned vehicle. And the second receiver circuit is configured to monitor a respective availability and a respective quality of each of a current standby channel and at least one other channel within the frequency sub band while the first receiver circuit is receiving the signal, and to request an assignment of one of the at least one other channel as a new standby channel if the second receiver circuit determines that the quality of the one of the at least one other channel is better than the quality of the current standby channel.

By monitoring, for example, the quality metrics and quality scores of the other channels within the assigned frequency sub band, and by requesting reassignment of the standby channel when the quality of the current standby channel is too low to allow proper control of the unmanned vehicle, such a radio significantly reduces the chances that the quality of the standby channel will be too low after a channel switchover, and thus significantly reduces the number of, or eliminates, times during which the pilot is distracted with channel-quality monitoring, and times during which the unmanned aircraft experiences a flyaway condition.

DETAILED DESCRIPTION

Each non-zero value, quantity, or attribute herein preceded by "substantially," "approximately," "about," a form or derivative thereof, or a similar term, encompasses a range that includes the value, quantity, or attribute ±20% of the value, quantity, or attribute, or a range that includes ±20% of a maximum difference from the value, quantity, or attribute. And for a zero-value, the encompassed range is ±1 of the same units unless otherwise stated.

Figure 2:
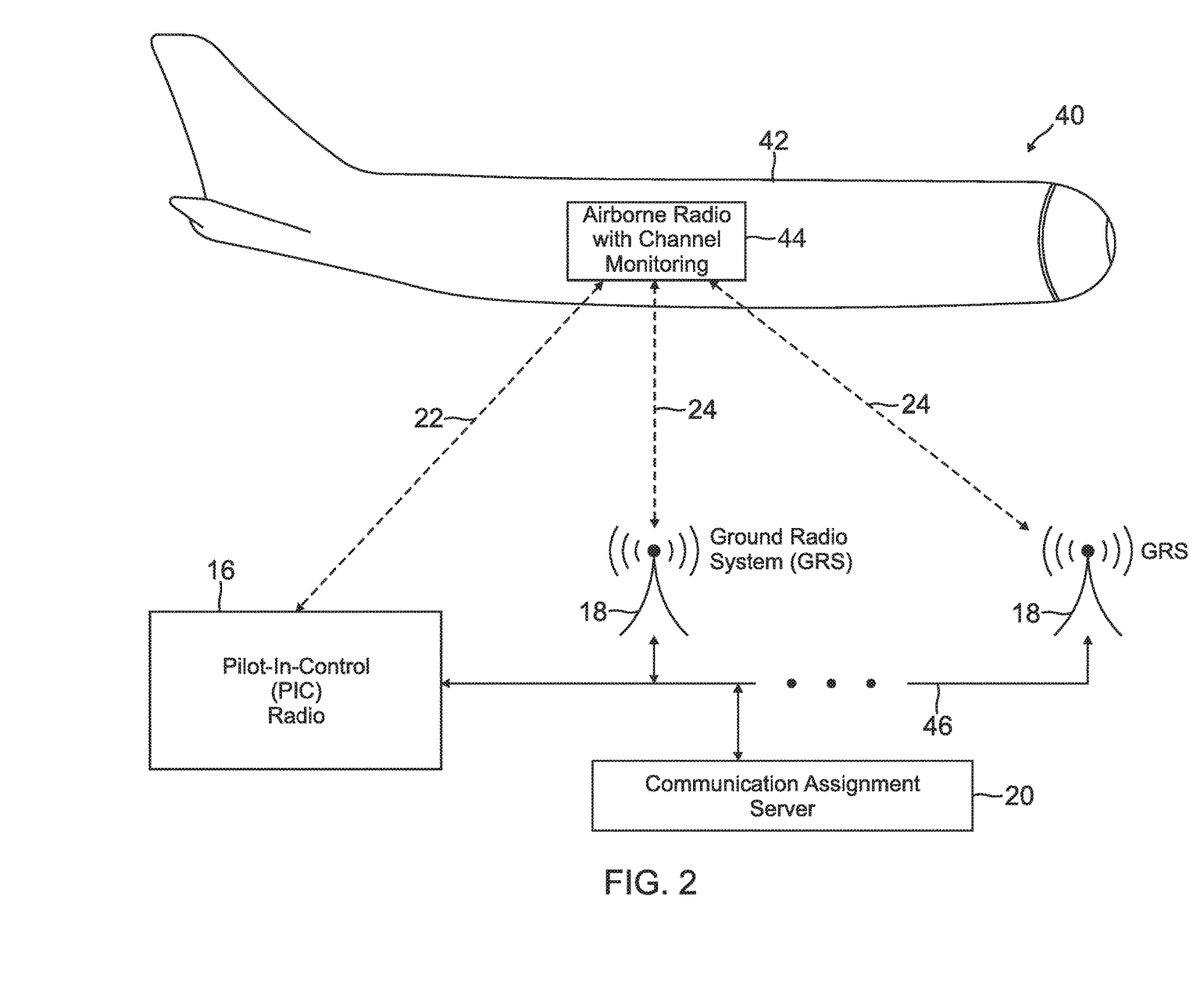
FIG. 2 is a diagram of a system that includes an unmanned aircraft and an improved communication system configured to allow a pilot to fly, and otherwise to control, remotely the unmanned aircraft, according to an embodiment.

FIG. 2 is a diagram of an unmanned-aircraft system 40, which includes an unmanned aircraft 42 having an airborne radio 44 with channel monitoring, according to an embodiment. In FIG. 2, like numbers reference components of the system 40 common to the system 10 of FIG. 1. Other than including the airborne radio 44 and a common communication link 46 over which the PIC radio 16, GRSs 18, and communication-assignment server 20 can communicate with one another, the system 40 can be similar to the unmanned-aircraft system 10 of FIG. 1. Furthermore, the communication link 46 can be the same as, or similar to, one of the links 26 and 28 of FIG. 1.

In addition to being configured to communicate with the PIC radio 16 or a GRS 18 over an active wireless channel 22 or 24, respectively, the airborne radio 44 is configured to monitor the quality of the standby channel, to monitor the quality of at least one of the other channels within the same sub band as the active and standby channels, and to request reassignment of the standby channel to an unassigned channel if the quality of the standby channel becomes too low to support accurate communications between the airborne radio and the PIC radio or GRS 18. And the airborne radio 44 can also be configured to monitor the quality of the active channel and to request switching over to the standby channel if the quality of the active channel becomes too low to support accurate communications between the airborne radio and the PIC radio 16 or GRS 18.

Still referring to FIG. 2, operation of the system 40 is described, according to an embodiment.

While the pilot (not shown in FIG. 2), via the PIC radio 16, is sending flight commands to the airborne radio 44 over the active wireless channel 22, the airborne radio is monitoring the assigned standby channel and at least one other channel in the assigned sub band, and is determining the respective quality levels of the standby channel and of the at least one other channel in a manner similar to that described above in conjunction with FIG. 1.

If the airborne radio 44 determines that the quality of the standby channel is, or becomes, too low for use as a communication channel between the airborne radio and the PIC radio 16, then the airborne radio determines whether the respective quality of any of the at least one other channel is suitable to carry communications between the airborne radio and the PIC radio.

If the airborne radio 44 determines that the quality of one of the at least one other communication channel is suitable to carry communication signals between the airborne radio and the PIC radio 16, then the airborne radio sends a request to the assignment server 20, for example, via the PIC radio, to reassign the one of the at least one other communication channel as the new standby channel. The PIC radio 16 can be configured to automatically route this request from the airborne radio 44 to the assignment server 20 via the link 46. If more than one of the at least one other communication channel have suitably high qualities, then the airborne radio sends a request to the assignment server 20 to reassign, as the new standby channel, the one of the at least one other communication channel having the highest quality. If the assignment server 20 denies the request to reassign the standby channel, because, for example, the requested other channel having the highest quality is in use by another unmanned aircraft system, then the airborne radio 44 can send a request to the assignment server to reassign, as the new standby channel, the one of the at least one other communication channel having the next-highest quality, and so on. If the assignment server 20 approves the request, then it sends, to the PIC radio 16, approval of the reassignment. The PIC radio 16 then can send the approval of the reassignment to the airborne radio 44, or the assignment server 20 can route the approval directly to the airborne radio via the PIC radio. In response to receiving approval of the reassigned standby channel, both the PIC radio 16 and the airborne radio 44 store the identity of the reassigned standby channel in memory circuits (not shown in FIG. 2) on board the PIC radio and the airborne radio, respectively.

By implementing the above procedure, the airborne radio 44 significantly increases the chances that if the PIC radio 16 automatically (or the pilot manually) switches over to the standby channel, then the standby channel will have a sufficient quality to carry communication signals between the PIC radio and the airborne radio. Therefore, by implementing the above procedure, the airborne radio 44 reduces the number of, or eliminates, times during which the unmanned aircraft 42 experiences a flyaway condition or during which the pilot is distracted from flying the aircraft.

The airborne radio 44 is configured to implement a similar procedure while it is communicating with the PIC radio 16 via a GRS 18 and an active wireless channel 24. Alternatively, because the GRS 18 is configured to communicate with the assignment server 20 directly over the communication link 46, the airborne radio 44 can bypass the PIC radio 16 and make the standby-channel reassignment request directly to the assignment server 20 via the GRS 18 and the link 46. If the assignment server 20 approves the reassignment of the standby channel, then it notifies, via the link 46 and the GRS 18, the airborne radio 44, and notifies, via the link 46, the PIC radio 16.

Still referring to FIG. 2, operation of the system 10 is described according to another embodiment.

The airborne radio 44 monitors, determines, and tracks (e.g., stores in a memory (not shown in FIG. 2) that is part of the airborne radio or that is otherwise on board the unmanned aircraft 42) the qualities of the current active channel 22, the current standby channel, and the at least one other channel in the sub band.

Furthermore, the airborne radio 44 switches over to the standby channel, or to one of the at least one other channel in the assigned sub band, if the quality of the current active channel is, or becomes, too low to support accurate communication between the airborne radio and the PIC radio 16.

If the airborne radio 44 determines that the quality of the currently active channel 22 is too low to support accurate communications between the airborne radio and the PIC radio 16, then the airborne radio determines whether the quality of the standby channel is high enough to support accurate communications between the airborne radio and the PIC radio.

If the airborne radio 44 determines that the quality of the standby channel is high enough to support accurate communications between the airborne radio and the PIC radio 16, then the airborne radio sends a request to the PIC radio to switch over to the standby channel.

In response to the request, the PIC radio 16 acknowledges the request to the airborne radio 44, and then the airborne and PIC radios automatically switch over to the standby channel at a predetermined time that is, for example, specified in the request, i.e., without any action by the pilot. For example, the automatic switch over to the standby channel may be transparent to the pilot.

Alternatively, the PIC radio 16 can notify the pilot of the request, for example, via a display on the PIC radio or via other means (e.g., an audio notification), and the pilot can manually switch over to the standby channel as described above in conjunction with FIG. 1.

If, however, the airborne radio 44 determines that the quality of the standby channel also is too low to support accurate communications between the airborne radio and the PIC radio 16, then the airborne radio sends a request to the assignment server 20 to reassign the active channel 22 to one of the at least one other channel in the sub band having a quality that is high enough to support accurate communications between the airborne radio and the PIC radio. For example, the airborne radio 14 can request the assignment server 20 to reassign the active channel 22 to the other channel that the airborne radio determined to have the highest quality.

If there is more than one other channel with a high-enough quality, then the airborne radio 14 can request the assignment server 20 to reassign both the current active channel 22 and the current standby channel to two of the other channels in the assigned sub band. For example, the airborne radio 14 can request the assignment server 20 to reassign the current active channel 22 and the current standby channel to the other two channels having the highest qualities (e.g., reassign the current active channel to the other channel having the highest quality, and reassign the current standby channel to the other channel having the second-highest quality).

In response to the request, if none of the requested other channels are available, then the assignment server 20 notifies the airborne receiver 44, which repeats the above process to select another one or more of the at least one other channel for reassignment of the current active channel, and possibly for reassignment of the current standby channel.

If only one of the requested other channels are available, then the assignment server 20 reassigns the current active channel 22 to the one of the requested other channels (e.g., even if the airborne radio 14 requested reassignment of the standby channel to this other channel), and notifies the airborne radio 44 and the PIC radio 16 of the active-channel reassignment. If the airborne radio 44 also requested reassignment of the standby channel, then the assignment server 20 notifies the airborne radio that the second requested channel is unavailable, and the airborne receiver repeats the above-described process to request reassignment of the standby channel to another one of the other channels.

If both of the requested other channels are available, then the assignment server 20 respectively reassigns the current active channel 22 and the current standby channel to the two requested other channels, and notifies the airborne radio 44 and the PIC radio 16 of the reassignment.

After the PIC radio 16 acknowledges the reassignment of the current active channel 22 to the airborne radio 14, the airborne and PIC radios switchover the current active channel to the newly assigned active channel. In a manner similar to that described above, the pilot may switchover the PIC radio 16 and airborne radio 44 to the newly assigned active channel manually via a control on the PIC radio, or the PIC and airborne radios can implement the switch over automatically without pilot action. For example, the automatic switch over to the newly assigned active channel may be transparent to the pilot.

And if the assignment server 20 also reassigned the current standby channel to another one of the channels in the sub band, then the PIC radio 16 acknowledges the request to the airborne radio 44, and both the airborne and PIC radios store the identity of the reassigned standby channel in memory circuits (not shown in FIG. 2) on board the airborne radio and the PIC radio, respectively.

While the airborne radio 44 is communicating with the PIC radio 16 via a current active wireless channel 24 and a GRS 18, the airborne radio can implement a similar procedure to request reassignment of the current active channel 24, and also to request reassignment of the current standby channel, between the airborne radio and the GRS.

Still referring to FIG. 2, alternate embodiments of the system 40 are contemplated. For example, although described as being a wired link, the link 46 can be a wireless link in part or in totality. Furthermore, although described as allowing only one channel to be assigned as a standby channel at any given time, the system 40 can be configured to allow assignment of two or more standby channels at any given time so that if the quality of a first standby channel is too low to support accurate communications, the airborne radio 44 can initiate a switchover from the active channel to a second standby channel. Moreover, although the airborne radio 44 is described as being configured to request reassignment of the current active and standby channels, one or more of the PIC radio 16 and the GRSs 18 can be so configured instead of, or in addition to, the airborne radio 44 being so configured. In addition, although described as including an unmanned aircraft 42, the system 40 can include any other type of unmanned vehicle instead of, or in addition to, the unmanned aircraft. Furthermore, in addition to determining, monitoring, and tracking the quality of a respective channel, the airborne radio 44 can be configured to monitor and to determine the availability of each channel other than the active and standby channels. For example, the airborne radio 44 can be configured to detect whether a respective other channel is being used for communications between a PIC radio or GRS and another unmanned aircraft.

Figure 3:
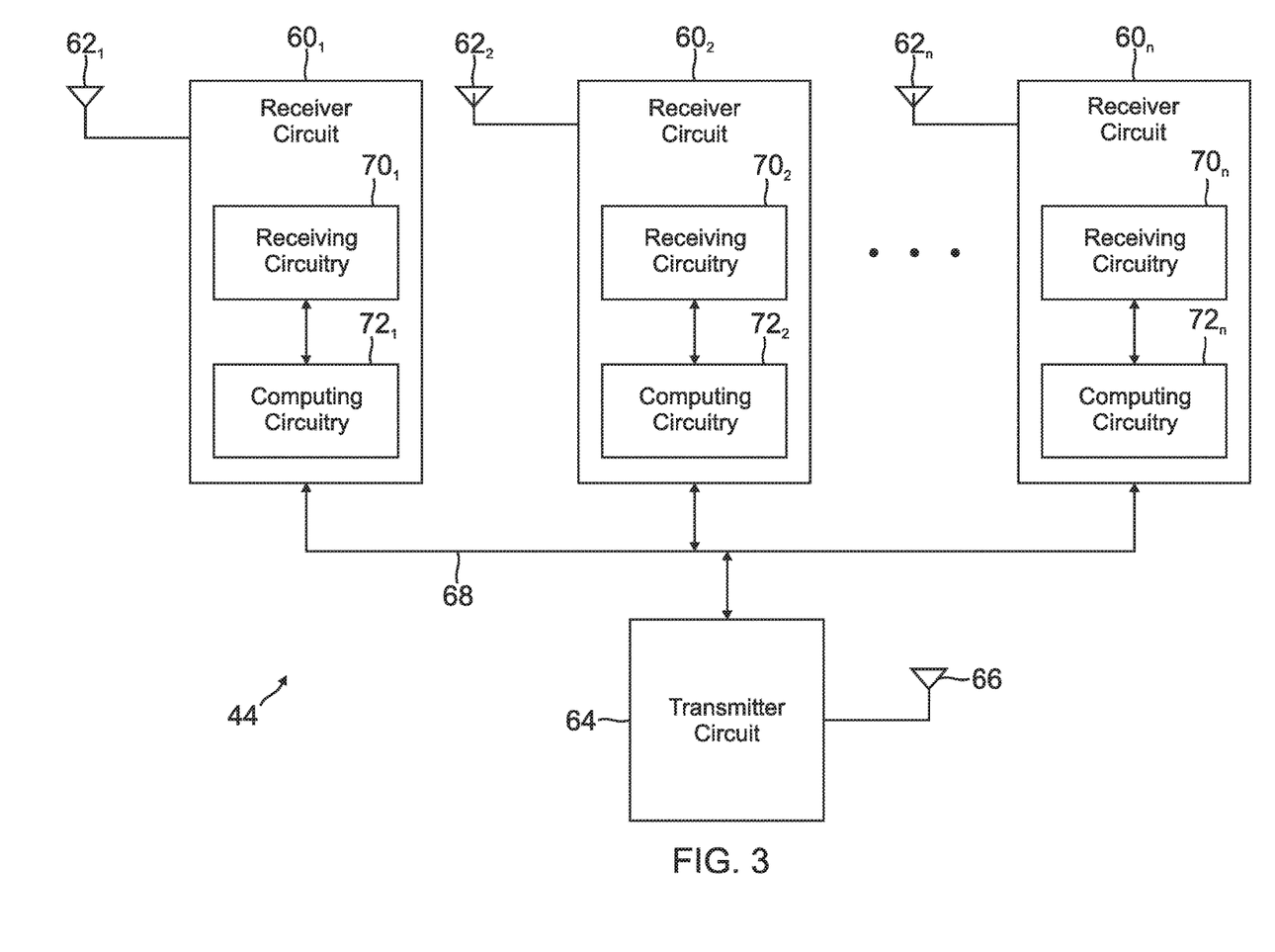
FIG. 3 is a diagram of the airborne radio of FIG. 2, according to an embodiment.

FIG. 3 is a diagram of the airborne radio 44 of FIG. 2, according to an embodiment.

The airborne radio 44 includes two or more receiver circuits $60_1$-$60_n$, a corresponding number of receive antennas $62_1$-$62_n$, a transmitter circuit 64, a transmit antenna 66, and a network 68 (e.g., a bus, Ethernet®) over which the receiver circuits are configured to communicate with one another and with the transmitter circuit.

Each receiver circuit $60_1$-$60_n$ includes respective receiving circuitry $70_1$-$70_n$ and respective computing circuitry $72_1$-$72_n$.

Each receiving circuitry 70 can be any suitable receiving circuitry, such as a frequency-tunable super heterodyne receiver, that is configured to receive, via a respective receiving antenna 62, a signal over a respective channel within the sub band assigned to the airborne radio 44 by the assignment server 20 (FIG. 2), and that is configured to process the received signal, by, e.g., performing one or more of amplifying, demodulating, and decoding the received signal. In addition to being configured to provide the processed received signal to the respective computing circuitry 72, each receiving circuitry 70 is configured to provide the processed received signal to a navigation and control system (not shown in FIG. 3) on board the unmanned aircraft 42 (FIG. 2). Such a navigation and control system is configured to maneuver, and otherwise to control, the unmanned aircraft 42 in response to the pilot commands that the processed received signal carries. Furthermore, if the unmanned aircraft 42 includes one or more other systems, such as a weapons system (not shown in FIG. 3), then each receiving circuitry 70 is configured to provide the processed received signal to each of these other systems.

Each computing circuitry 72 can be any suitable computing circuitry such as a microprocessor, microcontroller, field-programmable gate array (FPGA), or other software-, firmware-, or bit-pattern configurable circuitry, that is configured to analyze the processed signal from the respective receiving circuitry 70, and that is configured to determine the quality of the respective channel over which the receiving circuitry received the analyzed signal. For example, the computing circuitry 72 can be configured to determine, in a conventional manner, quality metrics associated with the channel, such quality metrics including, e.g., signal strength (a measure of signal attenuation imparted by the channel), the level and type of signal distortion, the level of signal jamming in the channel, the level and type of interference in the channel, and the level of noise in the channel. Further to this example, the computing circuitry 72 can be configured to generate, in a conventional manner, a quality score for the channel in response to one or more of the quality metrics that the computing circuitry determines for the channel.

Furthermore, a first one of the receiver circuits 60 is configured as an active receiver circuit for receiving signals over the ACTIVE CHANNEL 22 or 24, a second one of the receiver circuits is configured as a main channel-monitoring receiver circuit, and third and subsequent receiver circuits re configured as auxiliary channel-monitoring receiver circuits. For example, the computing circuitry 72 of the main receiver circuit 60 can be configured to collect all of the channel-quality data from the active receiver circuit and the auxiliary receiver circuits, and to determine, for example, which of the monitored channels has the highest quality, which of the monitored channels has the second-highest quality, and so on. For purposes of example, it is assumed that the receiver circuit $60_1$ is configured as the active receiver circuit for receiving signals over the ACTIVE CHANNEL 22 or 24, the receiver circuit $60_2$ is configured as the main-channel-monitoring receiver circuit, and the remaining receiver circuits $60_3$-$60_n$ are configured as auxiliary-channel-monitoring receiver circuits. It is understood, however, that the receiver circuit $60_1$ could be a main or auxiliary receiver circuit, that the receiver circuit $60_2$ could be an active or auxiliary receiver circuit, that any of the receiver circuits $60_3$-$60_n$ could be an active receiver circuit or a main receiver circuit, and that the airborne radio 44 could include as few as two receiver circuits $60_1$ and $60_2$ such that the airborne radio would include no auxiliary receiver circuits.

Each of the receive antennas 62 can be any suitable type of receive antenna, the transmitter circuit 64 can be any suitable type of transmitter circuit, the transmit antenna 66 can be any suitable type of transmit antenna, and the network 68 can be any suitable type of communication network (e.g., Ethernet®).

Still referring to FIG. 3, operation of the airborne receiver 44 is described according to an embodiment in which the receiver circuit $60_1$ is configured as the active receiver and receives a signal from either the PIC radio 16 or a GRS 18 over an ACTIVE CHANNEL 22 or 24 (FIG. 2), the receiver circuit $60_2$ is configured as the main-channel-monitoring receiver circuit and monitors the STANDBY CHANNEL, and the receiver circuits $60_3$-$60_n$ are configured as the auxiliary-channel-monitoring receiver circuits and, therefore, respectively monitor the AUXILIARY CHANNELS, which are the channels in the sub band other than the current ACTIVE CHANNEL and the current STANDBY CHANNEL. For purposes of the following example, it is assumed that the active receiver circuit $60_1$ receives the signal from the PIC radio 16 over the ACTIVE CHANNEL 22, it being understood that the below-described operation of the airborne radio 44 and its components would be similar if the active receiver circuit were to receive the signal from a GRS 18 over an ACTIVE CHANNEL 24.

While the receiving circuitry $70_1$ of the active receiver circuit $60_1$ is receiving and processing the signal from the PIC radio 16 via the ACTIVE CHANNEL 22, and is providing the processed signal, and the pilot commands that the processed signal carriers, to a control and navigation subsystem on board the aircraft 42 (not shown in FIG. 3), the computing circuit $72_1$ of the active receiver circuit analyzes the processed signal and determines, monitors, and tracks the quality of the ACTIVE CHANNEL 22. For example, the computing circuit $72_1$ may store a history of the determined quality metrics and quality score of the ACTIVE CHANNEL 22 in a memory (not shown) on board the receiver circuit $60_1$.

Also while the receiving circuitry $70_1$ of the active receiver circuit $60_1$ is receiving and processing the signal from the PIC radio 16 (FIG. 1), the respective receiving circuitry $70_2$-$70_n$ of each of the main and auxiliary receiver circuits $60_2$-$60_n$ is receiving and processing one or more other signals received over a respective other channel (a respective one of the STANDBY CHANNEL and the AUXILIARY CHANNELS) in the assigned frequency band, and the computing circuit $72_2$-$72_n$ of the respective receiver circuit analyzes the processed signal and determines, monitors, and tracks the quality of the respective other channel. For example, the PIC radio 16, or another signal source, may transmit a respective test signal over each of the other channels (active channel monitoring), or the one or more other signals may emanate from another, unknown source (passive channel monitoring). Furthermore, the computing circuit $72_2$-$72_n$ may store a respective history of the determined quality metrics and quality score of the respective other channel in a memory (not shown) on board the receiver circuit $60_2$-$60_n$.

If there are enough main and auxiliary monitoring receiver circuits $60_2$-$60_n$ for there to be at least one receiver circuit per each other channel, then each respective receiving circuitry 70 of the main and auxiliary receiver circuits 60 is tuned to receive and process signals over a single respective other channel (other than the ACTIVE CHANNEL 22), and each respective computing circuitry 72 of the main and auxiliary receiver circuits analyzes the processed signals and monitors, determines, and tracks the quality of a single respective other channel.

But if there are not enough main and auxiliary receiver circuits 60 for there to be at least one receiver circuit per each other channel, then at least one of the respective main and auxiliary receiver circuits can tune its respective receiving circuitry 70 to receive signals over a first other channel during a first time window, to receive signals over a second other channel during a second time window, and so on, such that the respective computing circuit 70 analyzes the processed signals and monitors, determines, and tracks the quality of the respective other channels in a time-multiplexed manner. That is, the respective computing circuit 70 determines the quality of the first other channel during the first time window, determines the quality of the second other channel during the second time window, and so on. For example, if there are four main and auxiliary receiver circuits $60_2$-$60_{n=5}$ and eight channels (including the STANDBY CHANNEL) in the assigned sub band other than the ACTIVE CHANNEL (e.g., a total of nine channels in the sub band), then each main and auxiliary receiver circuit determines and monitors the quality of a respective two of the other channels in the above-described time-multiplexed manner. For purposes of the below-described operational example, it is assumed that there are five channels in the assigned sub band, and only one auxiliary receiver circuit $60_{n=3}$. The five channels are ACTIVE CHANNEL, STANDBY CHANNEL, AUXILIARY CHANNEL 1, AUXILIARY CHANNEL 2, and AUXILIARY CHANNEL 3.

During a first time period having a duration of, e.g., approximately 1.0 milliseconds (ms) to 1.0 seconds (s), the active receiving circuitry $70_1$ receives and processes signals from the PIC 16 (FIG. 2) via the ACTIVE CHANNEL 22, and the computing circuitry $72_1$ analyzes these processed signals to determine the quality of the ACTIVE CHANNEL.

Further during the first time period, the main-channel-monitoring receiving circuitry $70_2$ receives test or other signals over the STANDBY CHANNEL and processes these signals, and the computing circuitry $72_2$ analyzes the processed signals and determines one or more quality metrics, and possibly a quality score, for the STANDBY CHANNEL.

Moreover during the first time period, the receiving circuitry $70_{n=3}$ of the auxiliary-channel-monitoring receiving circuitry $60_{n=3}$ receives test or other signals over AUXILIARY CHANNEL 1 and processes these signals, and the computing circuitry $72_{n=3}$ analyzes these signals and determines one or more quality metrics, and possibly a quality score, for AUXILIARY CHANNEL 1.

During or after the first time period, the computing circuitry $72_1$ and $72_{n=3}$ of the active and auxiliary receiver circuits $60_1$ and $60_{n=3}$ provide, to the computing circuitry $72_2$ of the main receiver circuit $60_2$, the respective quality metrics (and quality scores if generated) of the ACTIVE CHANNEL and AUXILIARY CHANNEL 1, respectively (the computing circuitry $72_2$ already "has" the quality metrics (and quality score if generated) for the STANDBY CHANNEL). The computing circuitry $72_2$ stores the quality information for the ACTIVE CHANNEL, STANDBY CHANNEL, and AUXILIARY CHANNEL 1 in a memory circuit (not shown in FIG. 3) of the receiver circuit $60_2$. For example, the computing circuit $72_2$ may store a quality history for the ACTIVE CHANNEL, STANDBY CHANNEL, and AUXILIARY CHANNEL 1 in the memory circuit.

After the first time period has ended, the computing circuitry $72_2$ of the main receiving circuitry $60_2$ tunes the receiving circuitry $70_2$ to receive one or more signals over AUXILIARY CHANNEL 2, and instructs the computing circuitry $72_{n=3}$ of the receiver circuit $60_{n=3}$ to tune the receiving circuitry $70_{n=3}$ to receive one or more signals over AUXILIARY CHANNEL 3.

During a second time period having a duration of, e.g., approximately 1.0 ms to 1.0 s, which second time period can commence immediately, or a non-zero time, after the first time period, the active receiving circuitry $70_1$ continues to receive and process one or more signals from the PIC 16 via the ACTIVE CHANNEL 22 (FIG. 2), and the computing circuitry $72_1$ continues to determine the quality of the ACTIVE CHANNEL and to store quality information for the ACTIVE CHANNEL in memory.

Further during the second time period, the receiving circuitry $70_2$ of the main receiver circuit $60_2$ receives one or more test or other signals over AUXILIARY CHANNEL 2 and processes these signals, and the computing circuitry $72_2$ analyzes these signals and determines one or more quality metrics, and possibly a quality score, for AUXILIARY CHANNEL 2 and stores quality information for AUXILIARY CHANNEL 2 in memory.

Moreover during the second time period, the receiving circuitry $70_{n=3}$ of the auxiliary receiver circuit $60_{n=3}$ receives one or more test or other signals over AUXILIARY CHANNEL 3 and processes these signals, and the computing circuitry $72_{n=3}$ analyzes these signals and determines one or more quality metrics, and possibly a quality score, for AUXILIARY CHANNEL 3 and stores quality information for AUXILIARY CHANNEL 3 in memory.

During or after the second time period, the computing circuitry $72_1$ and $72_{n=3}$ of the active and auxiliary receiver circuits $60_1$ and $60_{n=3}$ provide, to the computing circuitry $72_2$ of the main receiving circuit $60_2$, the respective quality metrics (and quality scores if generated) of the ACTIVE CHANNEL and AUXILIARY CHANNEL 3, respectively (the computing circuitry $70_2$ already "has" the quality metrics (and quality score if generated) for AUXILIARY CHANNEL 2). The computing circuitry $72_2$ stores the quality information for the ACTIVE CHANNEL, AUXILIARY CHANNEL 2, and AUXILIARY CHANNEL 3 in the memory circuit (not shown in FIG. 3) of the receiver circuit $60_2$.

After the second time period, the computing circuitry $72_2$ of the main receiver circuit $60_2$ compares the quality information for each of the ACTIVE CHANNEL 22, STANDBY CHANNEL, AUXILIARY CHANNEL 1, AUXILIARY CHANNEL 2, and AUXILIARY CHANNEL 3, and determines the following: 1) the order of these channels from the channel having the highest quality to the channel having the lowest quality, 2) which, if any, of the channels has a respective quality that is above a quality threshold stored in the memory circuit of the main receiver circuit $60_2$ (not shown in FIG. 3), and which, if any, of the channels has a respective quality that is below the quality threshold.

If the computing circuitry $72_2$ determines that both the ACTIVE CHANNEL 22 and the STANDBY CHANNEL have quality levels that are above the quality threshold, then the computing circuitry $72_2$ continues to monitor, to determine, and to track the quality levels of the ACTIVE CHANNEL, STANDBY CHANNEL, AUXILIARY CHANNEL 1, AUXILIARY CHANNEL 2, and AUXILIARY CHANNEL 3, by repeating the above-described monitoring procedure.

If, however, the computing circuitry $72_2$ determines that the ACTIVE CHANNEL has a quality that is below the quality threshold, and that the STANDBY CHANNEL has a quality that is above the quality threshold, then the computing circuitry $72_2$ sends, via the transmitter 64, the transmit antenna 66, the ACTIVE CHANNEL 22 (or the STANDBY CHANNEL if the quality of the ACTIVE CHANNEL is too low to carry a request signal), a request to the PIC radio 16 (FIG. 2) to switch the ACTIVE CHANNEL over to the STANDBY CHANNEL. The PIC radio 16 may switch the ACTIVE CHANNEL over to the STANDBY CHANNEL automatically, or may request, e.g., via a visual or audio notification, the pilot to perform the switch over, e.g., via a switch. After the switch over, the receiver circuit $60_2$ transitions from being the main-channel-monitoring receiver circuit to the new active receiver circuit, and the receiver circuit $60_1$ transitions from being the active receiver circuit to being an auxiliary receiver circuit.

If the computing circuitry $72_2$ determines that the ACTIVE CHANNEL has a quality that is above the quality threshold, that the STANDBY CHANNEL has a quality that is below the quality threshold, and that at least one of AUXILIARY CHANNEL 1-AUXILIARY CHANNEL 3 has a quality that is above the quality threshold, then the computing circuitry $72_2$ sends, via the transmitter 64, the transmit antenna 66, the ACTIVE CHANNEL 22, and the PIC radio 16 (FIG. 2), a request to the assignment server 20 to reassign the STANDBY CHANNEL to one of AUXILIARY CHANNEL 1-AUXILIARY CHANNEL 3. For example, if AUXILIARY CHANNEL 3 has the highest quality level of AUXILIARY CHANNEL 1-AUXILIARY CHANNEL 3, then the computing circuitry $72_2$ requests the assignment server 20 to assign AUXILIARY CHANNEL 3 as the new STANDBY CHANNEL.

If the assignment server 20 refuses the request because, for example, the requested one of AUXILIARY CHANNEL 1-AUXILIARY CHANNEL 3 is unavailable (e.g., is being used by another unmanned-aircraft system), then the computing circuitry $72_2$ requests, via the ACTIVE CHANNEL 22 and the PIC radio 16 (FIG. 2), the assignment server to assign another of AUXILIARY CHANNEL 1-AUXILIARY CHANNEL 3 as the new STANDBY channel. For example, if AUXILIARY CHANNEL 2 has the second-highest quality level of AUXILIARY CHANNEL 1-AUXILIARY CHANNEL 3 after AUXILIARY CHANNEL 3, then the computing circuitry $72_2$ requests the assignment server to assign AUXILIARY CHANNEL 2 as the new STANDBY CHANNEL 1.

If the assignment server 20 refuses the request, then the computing circuitry $72_2$ repeats the above standby-channel-reassignment-request procedure for different ones of the other channels in the sub band until the assignment server approves the reassignment request. If the assignment server 20 approves none of the reassignment requests, then the computing circuitry $72_2$ can notify, via the ACTIVE CHANNEL 22, the PIC radio 16 (FIG. 2) that there is no current standby channel with a quality level above the quality threshold, and the PIC radio can so notify the pilot.

If, however, the assignment server 20 grants the request to reassign the STANDBY CHANNEL, then the receiver circuit 60 corresponding to the newly reassigned STANDBY CHANNEL becomes the new main receiver circuit. For example, if the assignment server 20 grants a request to make the AUXILIARY CHANNEL 3 the new STANDBY CHANNEL, then the receiver circuit $60_{n=3}$ becomes the new main receiver circuit, and the receiver circuit $60_2$ becomes an auxiliary receiver circuit.

If the assignment server 20 refuses the request, then the computing circuitry $72_2$ repeats the above-described standby-channel-reassignment-request procedure for different other channels in the sub band until the assignment server approves the reassignment request. If the assignment server 20 approves none of the reassignment requests, then the computing circuitry $72_2$ can notify, via the ACTIVE CHANNEL 22, the PIC radio 16 (FIG. 2) that there is no current standby channel with a quality level above the quality threshold, and the PIC radio can so notify the pilot.

Continuing with the operational example, if the computing circuitry $72_2$ determines that both the ACTIVE CHANNEL and the STANDBY CHANNEL have qualities that are below the quality threshold, and that at least one of AUXILIARY CHANNEL 1-AUXILIARY CHANNEL 3 has a quality that is above the quality threshold, then the computing circuitry $72_2$ sends, via the transmitter 64, the transmit antenna 66, the ACTIVE CHANNEL 22, and the PIC radio 16 (FIG. 2), a request to the assignment server 20 to reassign the ACTIVE CHANNEL 22 directly to one of AUXILIARY CHANNEL 1-AUXILIARY CHANNEL 3. For example, if AUXILIARY CHANNEL 3 has the highest quality level of AUXILIARY CHANNEL 1-AUXILIARY CHANNEL 3, then the computing circuitry $72_2$ requests the assignment server 20 to make AUXILIARY CHANNEL 3 the new ACTIVE CHANNEL. And if at least two of AUXILIARY CHANNEL 1-AUXILIARY CHANNEL 3 have qualities that are above the quality threshold, then the computing circuitry $72_2$ also sends, via the transmitter 64, the transmit antenna 66, the ACTIVE CHANNEL 22, and the PIC radio 16 (FIG. 2), a request to the assignment server 20 to reassign the STANDBY CHANNEL to another one of AUXILIARY CHANNEL 1-AUXILIARY CHANNEL 3. For example, if AUXILIARY CHANNEL 2 has the second-highest quality level of AUXILIARY CHANNEL 1-AUXILIARY CHANNEL 3, then the computing circuitry $72_2$ requests the assignment server to assign AUXILIARY CHANNEL 2 as the new STANDBY CHANNEL.

If the assignment server 20 refuses the request because, for example, the requested one or two of AUXILIARY CHANNEL 1-AUXILIARY CHANNEL 3 is unavailable (e.g., is being used by another unmanned-aircraft system), then the computing circuitry $72_2$ requests, via the ACTIVE CHANNEL 22 and the PIC radio 16 (FIG. 2), the assignment server to assign another of AUXILIARY CHANNEL 1-AUXILIARY CHANNEL 3 as the ACTIVE CHANNEL; and, if there are additional other auxiliary channels having qualities above the quality threshold, then the computing circuitry $72_2$ requests the assignment server to assign another of these other channels as the STANDBY CHANNEL. For example, if AUXILIARY CHANNEL 3 has the third-highest quality level of AUXILIARY CHANNEL 1-AUXILIARY CHANNEL 3 and this third-highest quality level is above the quality threshold, then the computing circuitry $72_2$ requests the assignment server 20 to assign AUXILIARY CHANNEL 3 as the new ACTIVE CHANNEL 22; and if there is at least one other channel in addition to AUXILIARY CHANNEL 1-AUXILIARY CHANNEL 3 having a quality level above the quality threshold, then the computing circuitry $72_2$ requests the assignment server to assign one of these at least one other auxiliary channels as the new STANDBY CHANNEL.

If the assignment server 20 refuses the request, then the computing circuitry $72_2$ repeats the above active-and-standby-channel-reassignment-request procedure for different other channels until the assignment server approves the reassignment request. If the assignment server 20 approves none of the reassignment requests, then the computing circuitry $72_2$ can notify, via the ACTIVE CHANNEL 22, the PIC radio 16 (FIG. 2) that there is no current channel with a quality level above the quality threshold, and the PIC radio can so notify the pilot.

If the assignment server 20 grants the request, then the receiver circuits 60 corresponding to the newly reassigned ACTIVE CHANNEL and STANDBY CHANNEL become the new active receiver circuit and the new main receiver circuit, respectively. For example, if the assignment server 20 grants a request to make the AUXILIARY CHANNEL 1 the new ACTIVE CHANNEL and the AUXILIARY CHANNEL 3 the new STANDBY CHANNEL, then the receiver circuit $60_2$ becomes the new active receiver circuit, the receiver circuit $60_{n=3}$ becomes the new main receiver circuit, and the receiver circuit $60_1$ becomes an auxiliary receiver circuit.

Still referring to FIG. 3, alternate embodiments of the airborne radio 44 are contemplated. For example, alternate embodiments described above in conjunction with FIG. 2 may be applicable to the airborne radio 44 of FIG. 3. Furthermore, instead of each receiver circuit 60 having its own computing circuitry 72, the airborne radio 44 can have computing circuitry that is common to all of the receiver circuits. Moreover, instead of including a respective receive antenna 62 for each receiver circuit 60, the airborne radio 44 may include one receive antenna that is shared by all of the receiver circuits, or multiple receive antennas each shared by respective groups of the receiver circuits. In addition, instead of including the transmit antenna 66, the transmitter 64 can be configured to transmit signals via one of the receive antennas 62. For example, the airborne radio 44 may include only a single antenna that acts as a receive antenna for all of the receiver circuits 60 and that acts as a transmit antenna for the transmitter 64. Furthermore, instead of requesting reassignment of the ACTIVE CHANNEL 22 to the STANDBY CHANNEL only if the quality of the ACTIVE CHANNEL is below the quality threshold, the main receiver circuit $60_2$ may request reassignment of the ACTIVE CHANNEL to the STANDBY CHANNEL if the quality of the STANDBY CHANNEL is better than the quality of the ACTIVE CHANNEL. Furthermore, instead of requesting reassignment of the STANDBY CHANNEL to an AUXILIARY CHANNEL only if the quality of the STANDBY CHANNEL is below the quality threshold, the main receiver circuit $60_2$ may request reassignment of the STANDBY CHANNEL to an AUXILIARY CHANNEL if the quality of the AUXILIARY CHANNEL is better than the quality of the STANDBY CHANNEL. Moreover, the quality threshold for one channel may be different than the quality threshold for another channel. In addition, if the airborne radio 44 includes only two receiver circuits $60_1$ and $60_2$, then the main receiver circuit $60_2$ is configured to perform all of the functions attributed to the receiver circuits $60_2$ and $60_{n=3}$ in the above example. And, in addition to determining, monitoring, and tracking the quality of a respective channel, each of the receiver circuits 60 can be configured to monitor and to determine the availability of one or more respective channels other than the active and standby channels. For example, the each receiver circuit 60 can be configured to detect whether a respective other channel is being used for communications between a PIC radio or GRS and another unmanned aircraft.

Figure 4:
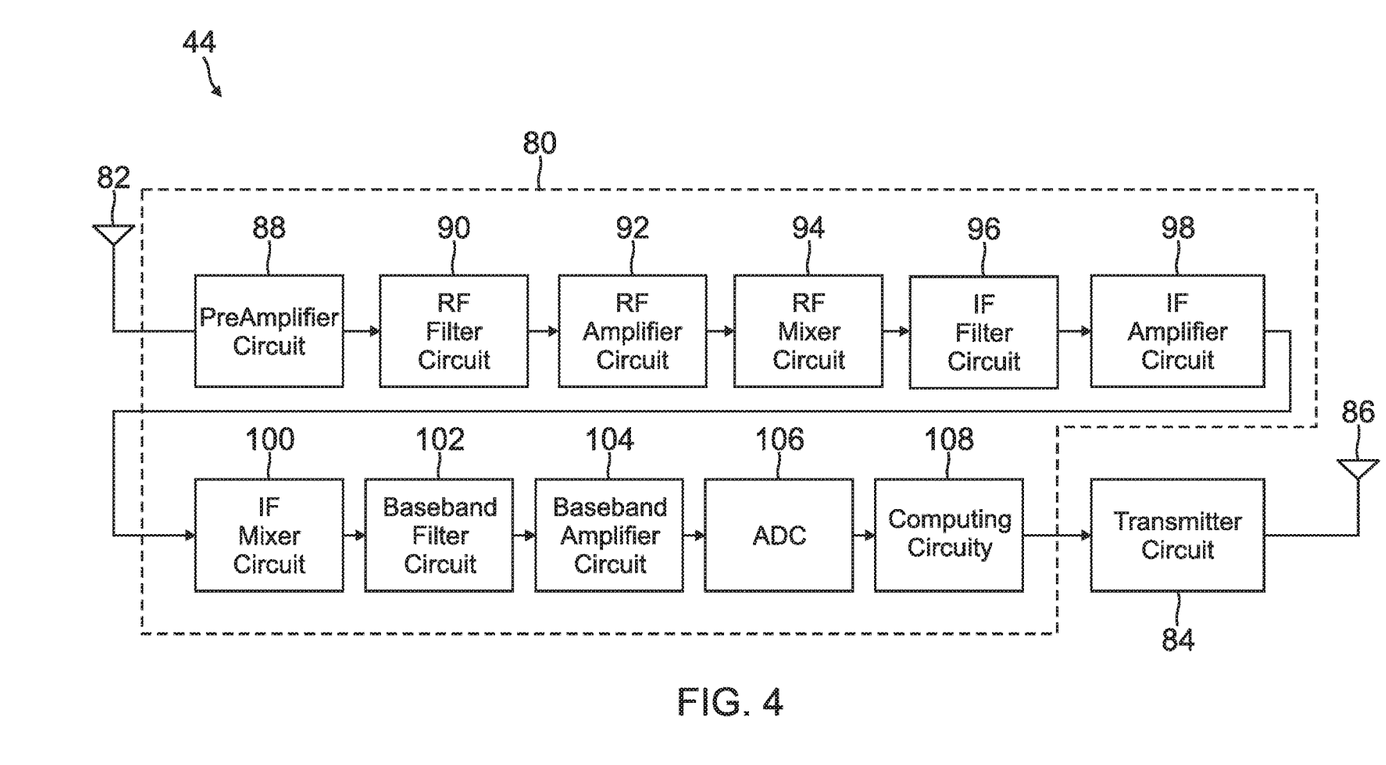
FIG. 4 is diagram of the airborne radio of FIG. 2, according to another embodiment.

FIG. 4 is a diagram of the airborne radio 44 of FIG. 2, according to another embodiment. Unlike the airborne radio 44 of FIG. 3, the airborne radio 44 of FIG. 4 includes a single, wideband receiver circuit 80, which is configured to determine the respective quality of each of the channels within the sub band that the assignment server 20 (FIG. 2) assigns to the airborne radio.

In addition to the receiver circuit 80, the airborne radio 44 includes a receive antenna 82, a transmitter circuit 84, and a transmit antenna 86.

The receive circuit 80 includes a preamplifier circuit 88, an radio-frequency (RF) filter circuit 90, an RF amplifier circuit 92, an RF mixer circuit 94, an intermediate-frequency (IF) filter circuit 96, an IF amplifier circuit 98, an IF mixer circuit 100, a baseband filter circuit 102, a baseband amplifier circuit 104, an analog-to-digital converter (ADC) 106, and computing circuitry 108.

The preamplifier circuit 88 can be a conventional preamplifier (e.g., a low-noise amplifier) that is configured to amplify signals received by the receive antenna 82 over all of the channels (active, standby, and auxiliary channels) in the sub band assigned to the airborne radio 44.

The RF filter circuit 90 is a bandpass filter that is configured to filter, from the pre-amplified signals, noise and other signals that are outside of the RF frequency range of the modulated sub band, and the RF amplifier circuit 92 is configured to amplify the filtered RF signals.

The RF mixer circuit 94 is configured to downshift, i.e., demodulate, the amplified filtered signals from RF frequencies to respective intermediate frequencies (IF).

The IF filter circuit 96 is configured to filter, from the demodulated signals, noise and other signals that are outside of the IF frequency range of the RF-demodulated sub band, and the IF amplifier circuit 98 is configured to amplify the filtered IF signals.

The IF mixer circuit 100 is configured to downshift, i.e., demodulate, the amplified filtered signals from IF frequencies to respective baseband frequencies.

The baseband filter circuit 102 is configured to filter, from the demodulated signals, noise and other signals that are outside of the baseband frequency range of the sub band, and the baseband amplifier circuit 104 is configured to amplify the baseband filtered signals.

The analog-to-digital converter (ADC) 106 is configured to convert the amplified baseband signals into a digital combined signal (i.e., a digital time-domain signal).

And the computing circuitry 108 is configured to recover, from the digital combined signal, the signals that the receiver circuit 80 respectively received over each channel (active, standby, and auxiliary channels) of the sub band. For example, the computing circuitry 108 can be configured to implement a Fast Fourier Transform (FFT) on the digital combined signal to recover the signals respectively received over each channel of the sub band. The computing circuitry 108 is also configured to recover the pilot commands carried by the signal on the active channel, and to provide the recovered pilot commands to a control and navigation system (not shown in FIG. 4) that is configured to maneuver, and to otherwise control, the unmanned aircraft 42 (FIG. 2) in response to the pilot commands (the computing circuitry also can be configured to provide the recovered pilot commands to another system, such as a weapons system, on board the unmanned aircraft). And the computing circuitry 108 is further configured to determine, monitor, and track the respective quality of each of the channels in the sub band, and to request reassignment of the ACTIVE CHANNEL and of the STANDBY CHANNEL as needed.

The receive antenna 82 can be any suitable receive antenna with a bandwidth wide enough to receive signals over all of the channels of the assigned sub band.

The transmitter circuit 84 is configured to transmit channel-reassignment requests, and possibly other signals, from the computing circuitry 108 to the assignment server 20 via the PIC radio 16 or a GRS 18 (FIG. 2) and an active channel 22 or 24 or a standby or auxiliary channel.

And the transmit antenna 86 can be any suitable transmit antenna.

Still referring to FIG. 4, operation of the airborne radio 44 is described according to an embodiment.

The receiver antenna 82 receives signals (actively or passively) from all of the channels of the assigned sub band on which signals are present.

The preamplifier circuit 88 amplifies the signals received by the antenna 82, and the RF filter circuit 90 bandpass filters the amplified signals.

The RF mixer circuit 92 demodulates the filtered RF signals to respective IF signals, and the IF filter circuit 94 bandpass filters the IF signals.

The IF amplifier circuit 96 amplifies the filtered IF signals, and the IF mixer circuit 98 demodulates the filtered IF signals to respective baseband-frequency signals.

The baseband filter circuit 100 bandpass filters the baseband-frequency signals, and the baseband amplifier circuit 102 amplifies the filtered baseband-frequency signals.

The ADC 104 converts the amplified baseband-frequency signals into a combined digital signal.

The computing circuitry 106 subjects the combined digital signal to a FFT to recover the respective base-band frequency signal(s) received over each channel in the sub band assigned to the airborne radio 44 by the assignment server 20 (FIG. 2).

The computing circuit 106 recovers pilot commands from the recovered signal received over the active channel, and provides the recovered pilot commands to a navigation and control circuit (not shown in FIG. 4), and possibly other circuits (e.g., weapons circuits), on board the unmanned aircraft 42 (FIG. 2).

The computing circuit 106 also determines, monitors, and tracks the respective quality of each of the channels (active, standby, and auxiliary channels) in the assigned sub band, and requests, from the assignment server 20 (FIG. 2), reassignment of the active and standby channels as needed based on the qualities of the active and standby channels. For example, the computing circuitry 106 may request reassignment of the active channel, the standby channel, or both the active and standby channels, in a manner similar to the manner described above in conjunction with FIG. 3. And the computing circuit 106 can include a memory (not shown in FIG. 4) to store respective quality information, and a respective quality history, for each of the channels in the sub band.

Still referring to FIG. 4, alternate embodiments of the airborne radio 44 are contemplated. For example, alternate embodiments described above in conjunction with FIGS. 2 and 3 may be applicable to the airborne radio 44 of FIG. 4. Furthermore, in addition to determining, monitoring, and tracking the quality of a respective channel, the receiver circuit 80 can be configured to monitor and to determine the availability of one or more respective channels other than the active and standby channels. For example, the receiver circuit 80 can be configured to detect whether a respective other channel is being used for communications between a PIC radio or GRS and another unmanned aircraft.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

EXAMPLE EMBODIMENTS

Example 1 includes a radio configured for disposition on an unmanned vehicle, the radio comprising: a first receiver circuit configured to receive a signal over a current active channel within a frequency sub band corresponding to the unmanned vehicle; and a second receiver circuit configured to monitor a respective availability and a respective quality of each of a current standby channel and at least one other channel within the frequency sub band while the first receiver circuit is receiving the signal, and to request an assignment of one of the at least one other channel as a new standby channel if the second receiver circuit determines that the quality of the one of the at least one other channel is better than the quality of the current standby channel.

Example 2 includes the radio of Example 1 wherein the frequency sub band is within an L frequency band.

Example 3 includes the radio of Example 1 wherein the frequency sub band is within a C frequency band.

Example 4 includes the radio of Example 1 wherein the first and second receiver circuits are a same wide-band receiver circuit.

Example 5 includes the radio of Example 1 wherein the first and second receiver circuits are a same simultaneous-multi-channel-receiving receiver circuit.

Example 6 includes the radio of Example 1 wherein the first and second receiver circuits are separate receiver circuits.

Example 7 includes the radio of Example 1 wherein the first and second receiver circuits are separate single-channel receiver circuits.

Example 8 includes the radio of Example 1 wherein one of the first and second receiver circuits is configured: to monitor a quality of the current active channel; and to request an assignment of the current standby channel as a new active channel if the one of the first and second receiver circuits determines that the quality of the current standby channel is better than the quality of the current active channel.

Example 9 includes the radio of Example 1 wherein one of the first and second receiver circuits is configured: to monitor a quality of the current active channel; and to request an assignment of one of the at least one other channel as a new active channel if the one of the first and second receiver circuits determines that the quality of the one of the at least one other channel is better than the qualities of the current active channel and of the current standby channel.

Example 10 includes the radio of Example 1 wherein the second receiver circuit is configured to request a frequency-assignment circuit to assign the one of the at least one other channel as the new standby channel if the second receiver circuit determines that the quality of the one of the at least one other channel is better than the quality of the current standby channel.

Example 11 includes the radio of Example 10, further comprising: a transmitter; and wherein the second receiver circuit is configured to cause the transmitter to request the frequency-assignment circuit to assign the one of the at least one other channel as the new standby channel if the second receiver determines that the quality of the one of the at least one other channel is better than the quality of the current standby channel.

Example 12 includes the radio of Example 10 wherein the second receiver circuit includes: first receiving circuitry configured to receive a respective other signal over each of the current standby channel and the at least one other channel; and computing circuitry configured to monitor the respective availability and the respective quality of each of the current standby channel and the at least one other channel within the frequency sub band by analyzing each respective other signal, and to request the assignment of one of the at least one other channel as a new standby channel if the computing circuitry determines that the quality of the one of the at least one other channel is better than the quality of the current standby channel.

Example 13 includes an unmanned vehicle, comprising: a radio, comprising a first receiver circuit configured to receive a signal over a current active channel within a frequency sub band corresponding to the unmanned vehicle, and a second receiver circuit configured to monitor a respective availability and a respective quality of each of a current standby channel and at least one other channel within the frequency sub band while the first receiver circuit is receiving the signal, and to request an assignment of one of the at least one other channel as a new standby channel if the second receiver circuit determines that the quality of the one of the at least one other channel is better than the quality of the current standby channel.

Example 14 includes the unmanned vehicle of Example 13 wherein the second receiver circuit is configured to request a frequency-assignment circuit to assign the one of the at least one other channel as the new standby channel if the second receiver circuit determines that the quality of the one of the at least one other channel is better than the quality of the current standby channel.

Example 15 includes the unmanned vehicle of Example 14 wherein the frequency-assignment circuit is disposed remote from the radio.

Example 16 includes the unmanned vehicle of Example 14 wherein the frequency-assignment circuit is disposed remote from the unmanned vehicle.

Example 17 includes a method, comprising: receiving a signal over an active channel within a frequency sub band corresponding to an unmanned vehicle; determining a respective availability and a respective quality of each of a current standby channel and of at least one other channel within the frequency sub band while receiving the signal; and requesting an assignment of one of the at least one other channel as a new standby channel if the quality of the current standby channel is worse than the quality of the one of the at least one other channel.

Example 18 includes the method of Example 17, further comprising: determining a quality of the current active channel; and requesting an assignment of the current standby channel as a new active channel if the determined quality of the current active channel is worse than the determined quality of the current standby channel.

Example 19 includes the method of Example 17, further comprising: determining a quality of the current active channel; and requesting an assignment of one of the at least one other channel as a new active channel if the determined quality of the current active channel is worse than the determined quality of the one of the at least one other channel.

Example 20 includes a non-transitory computer-readable medium storing instructions that, when executed by at least one computing circuit, cause the at least one computing circuit, or cause at least one other circuit under control of the at least one computing circuit: to receive a signal over an active channel within a frequency sub band corresponding to an unmanned vehicle; to determine a respective availability and a respective quality of each of a current standby channel and of at least one other channel within the frequency sub band while receiving the signal; and to request an assignment of one of the at least one other channel as a new standby channel if the quality of the current standby channel is worse than the quality of the one of the at least one other channel.

Although specific embodiments have been illustrated and described herein, it will be appreciated by those of ordinary skill in the art that any arrangement, which can achieve the same purpose, may be substituted for the specific embodiments shown. Therefore, it is manifestly intended that this invention be limited only by the claims and the equivalents thereof.

What is claimed is:

1. A radio configured for disposition on an unmanned vehicle, the radio comprising:
   a first receiver circuit configured to receive a signal over
      a current active channel within a frequency sub band corresponding to the unmanned vehicle; and
   a second receiver circuit configured
      to monitor a respective availability and a respective quality of each of a current standby channel and at least one other channel within the frequency sub band while the first receiver circuit is receiving the signal, and to request an assignment of one of the at least one other channel as a new standby channel in response to the second receiver circuit determining that the quality of the one of the at least one other channel is better than the quality of the current standby channel.

2. The radio of claim 1 wherein the frequency sub band is within an L frequency band.

3. The radio of claim 1 wherein the frequency sub band is within a C frequency band.

4. The radio of claim 1, further comprising a wide-band receiver circuit configured to implement the first and second receiver circuits.

5. The radio of claim 1, further comprising a simultaneous-multi-channel-receiving receiver circuit configured to implement the first and second receiver circuits.

6. The radio of claim 1 wherein the first and second receiver circuits are separate receiver circuits.

7. The radio of claim 1 wherein the first and second receiver circuits are separate single-channel receiver circuits.

8. The radio of claim 1 wherein one of the first and second receiver circuits is configured:
to monitor a quality of the current active channel; and
to request an assignment of the current standby channel as a new active channel in response to the one of the first and second receiver circuits
determining that the quality of the current standby channel is better than the quality of the current active channel.

9. The radio of claim 1 wherein one of the first and second receiver circuits is configured:
to monitor a quality of the current active channel; and
to request an assignment of one of the at least one other channel as a new active channel in response to the one of the first and second receiver circuits
determining that the quality of the one of the at least one other channel is better than the qualities of the current active channel and of the current standby channel.

10. The radio of claim 1 wherein the second receiver circuit is configured to request a frequency-assignment circuit to assign the one of the at least one other channel as the new standby channel in response to the second receiver circuit determining that the quality of the one of the at least one other channel is better than the quality of the current standby channel.

11. The radio of claim 10, further comprising:
a transmitter; and
wherein the second receiver circuit is configured to cause the transmitter to request the frequency-assignment circuit to assign the one of the at least one other channel as the new standby channel in response to the second receiver
determining that the quality of the one of the at least one other channel is better than the quality of the current standby channel.

12. The radio of claim 10 wherein the second receiver circuit includes:
first receiving circuitry configured to receive a respective other signal over each of the current standby channel and the at least one other channel; and
computing circuitry configured
to monitor the respective availability and the respective quality of each of the current standby channel and the at least one other channel within the frequency sub band by analyzing each respective other signal, and
to request the assignment of one of the at least one other channel as a new standby channel in response to the computing circuitry determining that the quality of the one of the at least one other channel is better than the quality of the current standby channel.

13. An unmanned vehicle, comprising:
a radio, comprising
a first receiver circuit configured to receive a signal over a current active channel within a frequency sub band corresponding to the unmanned vehicle, and
a second receiver circuit configured
to monitor a respective availability and a respective quality of each of a current standby channel and at least one other channel within the frequency sub band while the first receiver circuit is receiving the signal, and
to request an assignment of one of the at least one other channel as a new standby channel in response to the second receiver circuit determining that the quality of the one of the at least one other channel is better than the quality of the current standby channel.

14. The unmanned vehicle of claim 13 wherein the second receiver circuit is configured to request a frequency-assignment circuit to assign the one of the at least one other channel as the new standby channel in response to the second receiver circuit determining that the quality of the one of the at least one other channel is better than the quality of the current standby channel.

15. The unmanned vehicle of claim 14 wherein the frequency-assignment circuit is disposed remote from the radio.

16. The unmanned vehicle of claim 14 wherein the frequency-assignment circuit is disposed remote from the unmanned vehicle.

17. A method, comprising:
receiving a signal over an active channel within a frequency sub band corresponding to an unmanned vehicle;
determining a respective availability and a respective quality of each of a current standby channel and of at least one other channel within the frequency sub band while receiving the signal; and
requesting an assignment of one of the at least one other channel as a new standby channel in response to the quality of the current standby channel being worse than the quality of the one of the at least one other channel.

18. The method of claim 17, further comprising:
determining a quality of the current active channel; and
requesting an assignment of the current standby channel as a new active channel in response to the determined quality of the current active channel being worse than the determined quality of the current standby channel.

19. The method of claim 17, further comprising:
determining a quality of the current active channel; and
requesting an assignment of one of the at least one other channel as a new active channel in response to the determined quality of the current active channel being worse than the determined quality of the one of the at least one other channel.

20. A non-transitory computer-readable medium storing instructions that, when executed by at least one computing circuit, cause the at least one computing circuit, or cause at least one other circuit under control of the at least one computing circuit:

to receive a signal over an active channel within a frequency sub band corresponding to an unmanned vehicle;
to determine a respective availability and a respective quality of each of a current standby channel and of at least one other channel within the frequency sub band while receiving the signal; and
to request an assignment of one of the at least one other channel as a new standby channel in response to the quality of the current standby channel being worse than the quality of the one of the at least one other channel.

* * * * *